March 21, 1967     J. P. HUSSAR     3,310,121

COMBINATION ROOT CUTTER AND PLANT PULLER

Filed July 13, 1964

INVENTOR.
JOSEPH P. HUSSAR,
BY
Linton and Linton
ATTORNEYS.

3,310,121
COMBINATION ROOT CUTTER AND PLANT PULLER
Joseph P. Hussar, 74 Federal St.,
Weymouth, Mass. 02188
Filed July 13, 1964, Ser. No. 381,972
3 Claims. (Cl. 171—62)

The present invention is concerned with a combination root cutter and plant puller.

The principal object of the present invention is to provide a device which can be carried by one hand of the user and without the user bending over can grasp a small growth such as a plant, weed or the like, close to the ground, sever the root of growth, and the user can then pull the growth including the attached severed root from the ground leaving only a small opening in the ground and the withdrawn growth can be quickly and easily discharged into a suitable container.

A further and important object of the invention is to provide a combination root cutter and small growth puller which can be easily directed towards a plant or the like and by a simple downward movement of the device it will grasp one of various sized plants at the surface of the ground and the user can then, while grasping the plant, cut the root thereof underground by the use of one foot and then withdraw the plant with attached root from the ground without damaging surrounding growths such as other plants, grass or the like.

Another important object of the invention is to provide a root cutter and small growth puller having an elongated handle which can be held vertically to grasp the stalk of a growth and having a root cutter attached to said handle which can be operated to horizontally cut the root of the growth underground and then be withdrawn from the ground whereupon a vertical movement of the handle will withdraw the growth and attached root from the ground to leave a minimum size opening in the ground.

An equally important object of the invention is to provide a plant puller which automatically grasps the plant by placing the plant puller over the plant.

Further objects of the invention will be in part pointed out and in part obvious from the following description of the accompanying drawing in which.

Figure 5:
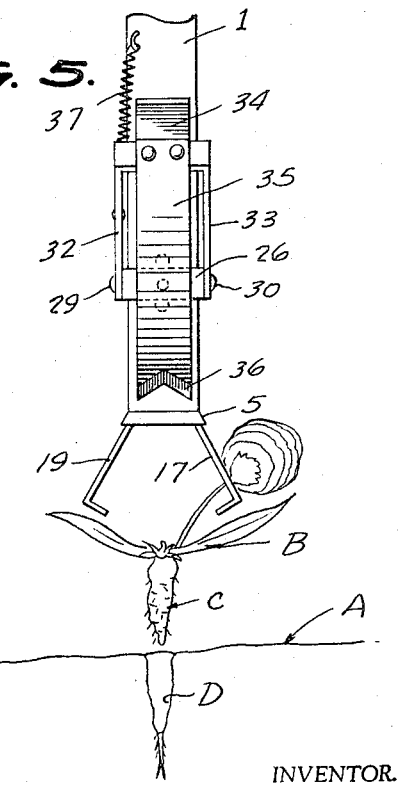
Figure 4:
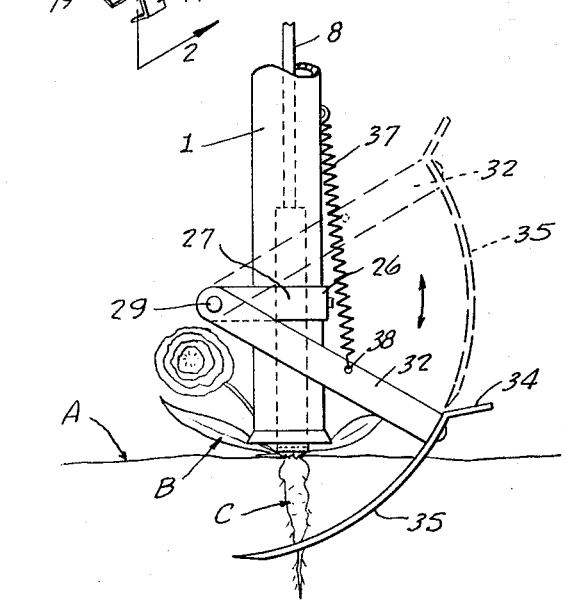
FIG. 4 is an enlarged side elevation of the lower portion of the present device when grasping a plant and cutting the root thereof.

And FIG. 5 is a further side elevation of the lower end portion of the present device taken at right angles to FIG. 4 and with the device when releasing the plant and root after pulling the same from the ground.

Referring now more particularly to the drawings, wherein like and corresponding parts are designated by similar reference characters, numeral 1 indicates an elongated tubular shaft having an upper bend 2 from which extends the upper free end portion providing a handle 3. An opening 4 is provided in the top of said bend 2 which is open to the bore 6 of said shaft. The opposite end of said shaft has an outwardly flared end portion 5 which includes the annular outwardly flared wall 7 defining the lower end of bore 6.

An elongated rod 8 extends through opening 4 and through bore 6 and has a knob 9 fixedly mounted on the end of said rod exteriorly of bend 2. The opposite end portion 10 of said rod has a reduced diameter and mates with opening 13 in semi-circular base 14 of the pinchers generally designated by numeral 12. End 10 is riveted at 11 so that base 14 is fixedly held between said end 11 and the shoulder provided by the difference in diameter of end portion 10 and the remainder of rod 8.

Pincher 12 is formed of one piece of resilient material such as spring steel or a plastic and besides semi-circular base 14 has a pair of straight legs 14 and 16 each integral with an end of said base providing an inverted U-shaped appearance to said base and legs. Leg 15 has a laterally slanting straight portion 17 and a jaw 18 extending inwardly and normal to portion 17. Similarly leg 16 has a laterally slanting straight portion 19 and inwardly extending jaw 20 normal to portion 19.

Shaft 1 has a pair of diametrically opposite slots 21 and 22 extending longitudinally of said shaft. A bolt 23 having a head larger than one of said slots extends through said slots and a tube 25 extending across the interior of said shaft between legs 15 and 16 and said bolt has a threaded end 24.

A U-shaped band has bolt end 24 extending through and in threaded engagement with the base 26 thereof while said base partially encircles shaft 1 and has straight legs 27 and 28 extending beyond said shaft.

Riveted pins 29 and 30 extend through legs 27 and 28 respectively and through one end of legs 32 and 33 respectively of a U-shaped pedal having a base 31 joining legs 32 and 33 at their opposite ends.

An arcuate root cutter 35 is fixedly connected to base 31 by conventional means such as rivets, screws or the like and has an angular end portion 34 extending laterally of said base 31 while the opposite end portion 36 has a sharpened inverted V-configuration.

A coil spring 37 is connected to shaft 1 at one end by conventional means such as a rivet, screw or the like while its opposite end extends through an opening 38 in the medial portion of leg 32.

In the use of the present device a user grips handle 3 and while holding shaft 1 vertically places jaws 18 and 20 on the ground A each on an opposite side of the stalk of a growth B and pushes shaft towards the ground while still holding said shaft vertically. Since jaws abut the ground A the downward movement of shaft 1 causes wall 7 to slide down on leg portions 17 and 19 drawing said legs together as they enter bore 6 and thus jaws 18 and 20 are moved together gripping the plant stalk, but remaining spaced apart so as not to sever the stalk. A spacing apart of jaws 18 and 20, of approximately 3/32 of an inch even when leg portions 17 and 19 are fully within bore 6 enable jaws 18 and 20 to hold almost all small growths. Extra heavy growths will prevent said jaws from closing to their full gap unless compensating extra pressure is applied to handle 3.

While jaws 18 and 20 are gripping the plant B and shaft 1 is vertical, the user applies one foot to the end portion 34 of the cutter and pushes the cutter 35 into the ground A until end 36 severs the plant root C. Legs 32 and 33 will thus pivot about pins 29 and 30 giving cutter 35 an arcuate movement with end 36 being substantially horizontal when it reaches root C.

Figure 1:
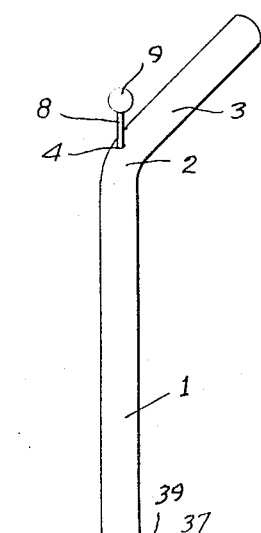
FIG. 1 is a perspective view of the present root cutter and growth puller in position for use.
Figure 2:
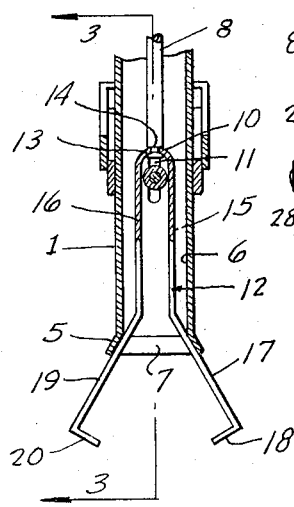
FIG. 2 is an enlarged cross-sectional view taken on line 2—2 of FIG. 1.
Figure 3:
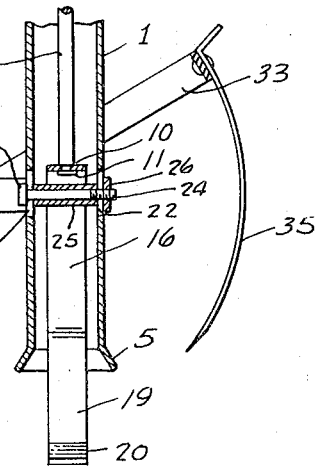
FIG. 3 is a cross-sectional view taken on line 3—3 of FIG. 2.

The root cutting movement of cutter 35 extends spring 37 so that after severance of the root and release of end portion 34 by the user's foot, said spring will return cutter 35 from the ground to the position shown in FIG. 1. Thereupon an upward movement by the user on handle 3 will draw the root C from the ground leaving only a small hole D in the ground.

A push on knob 9 moving rod 8 downwardly will move leg portions 17 and 19 from bore 6 and the resiliency of the gripper will move jaws 18 and 20 apart releasing plant B wherever directed and the device is then ready for pulling a second plant and so forth.

By loosening bolt 23 in band base 26, said bolt can be moved along slots 21 and 22 to vary the position on said band on said shaft and thus cutter. Tightening said bolt will hold the band in any desired position.

The present device is capable of considerable modification and such changes thereto as come within the scope of the appended claims is deemed to be a part of the invention.

I claim:

1. A root cutter and growth puller comprising a tubular shaft having a bore with an outwardly flared end portion, an inverted U-shaped resilient member having divergent leg portions terminating in opposing jaws, said resilient member being positioned in and extending from said shaft bore with said divergent leg portions slideably bearing against said shaft bore flared end portion, means for moving said resilient member longitudinally of said shaft bore, an arcuate cutter, a pair of legs fixedly connected to said arcuate cutter, a band adjustably mounted on the exterior of said shaft adjacent said flared end, pins pivotally connecting said legs to said band and resilient means tending to hold said arcuate cutter alongside said shaft.

2. A root cutter and growth puller comprising a tubular shaft having a bore with an outwardly flared end portion, an inverted U-shaped resilient member having divergent leg portions terminating in opposing jaws, said resilient member being positioned in and extending from said shaft bore with said divergent leg portions slideably bearing against said shaft bore flared end portions, means for moving said resilient member longitudinally of said shaft bore, an arcuate cutter, a pair of legs fixedly connected to and extending laterally from said cutter, a member having a pair of legs each pivotally connected to one of said first mentioned pair of legs, said shaft having a pair of diametrically opposite slots adjacent said shaft bore flared end portion, a bolt slideably extending through said slots and detachably connected to said member for holding said member at any desired position along the length of said slots and resilient means tending to hold said cutter alongside said shaft.

3. A root cutter and growth puller comprising a tubular shaft having a handle at one end and a bore with an annular outwardly flared end portion at the opposite end of said shaft, an inverted U-shaped resilient member having a base and a pair of legs extending from said base along said shaft bore, said legs having end portions diverging from one another and slideably bearing against said shaft bore flared end portion, a rod extending through said shaft into the bore thereof, fixedly connected to said resilient member base and capable of being moved for pushing said member divergent legs from said shaft bore, said shaft bore flared end portion being of a smaller width than the space between said member divergent legs when they are pushed outwardly of said shaft bore whereby said shaft bore flared end can bring said divergent legs towards one another when said shaft bore flared end is pushed along said divergent legs, said member divergent legs having jaws provided by their free ends which jaws extend normal to said leg divergent end portions and towards one another, an arcuate cutter pivotally connected to said shaft for pivoting to and from a position spaced below said shaft bore flared end portion and resilient means tending to retain said arcuate cutter from below said shaft.

References Cited by the Examiner

UNITED STATES PATENTS 1,239,201  9/1917  MacLachlan _____ 294—50.8

FOREIGN PATENTS 42,340  1/1933  Czechoslovakia.

ABRAHAM G. STONE, *Primary Examiner.*

ANTONIO F. GUIDA, *Examiner.*